(12) United States Patent
Chaffee et al.

(10) Patent No.: US 8,316,371 B2
(45) Date of Patent: Nov. 20, 2012

(54) TASK HIERARCHY IN AN EVENT-DRIVEN COMMUNICATION SYSTEM

(75) Inventors: Alexander D. Chaffee, San Francisco, CA (US); Matthew K. Work, San Francisco, CA (US); J. Leslie Brennan, San Francisco, CA (US)

(73) Assignee: Mindjet LLC, San Francisco, CA (US)

( * ) Notice: Subject to any disclaimer, the term of this patent is extended or adjusted under 35 U.S.C. 154(b) by 322 days.

(21) Appl. No.: 12/757,943

(22) Filed: Apr. 9, 2010

(65) Prior Publication Data

US 2010/0262653 A1  Oct. 14, 2010

Related U.S. Application Data

(60) Provisional application No. 61/168,063, filed on Apr. 9, 2009.

(51) Int. Cl.
*G06F 9/46* (2006.01)
(52) U.S. Cl. ......... 718/103; 718/107
(58) Field of Classification Search ......... 718/103, 718/107; 705/8, 9
See application file for complete search history.

(56) References Cited

U.S. PATENT DOCUMENTS

| | | | |
|---|---|---|---|
| 5,671,361 A | 9/1997 | Brown et al. | |
| 2008/0201713 A1* | 8/2008 | Chaffee et al. | 718/103 |
| 2008/0243948 A1 | 10/2008 | Guiheneuf et al. | |
| 2008/0306997 A1 | 12/2008 | Keohane et al. | |
| 2009/0006160 A1 | 1/2009 | Boegner | |
| 2009/0112677 A1 | 4/2009 | Rhett | |
| 2009/0133027 A1* | 5/2009 | Gunning et al. | 718/103 |
| 2010/0070328 A1* | 3/2010 | Motoyama et al. | 705/9 |
| 2010/0174578 A1* | 7/2010 | Duffy et al. | 705/9 |
| 2010/0293222 A1* | 11/2010 | Pope et al. | 709/203 |
| 2010/0299171 A1* | 11/2010 | Lau et al. | 705/8 |
| 2010/0313179 A1* | 12/2010 | Groves et al. | 717/101 |
| 2011/0029440 A1* | 2/2011 | Motoyama et al. | 705/301 |

* cited by examiner

*Primary Examiner* — Krisna Lim

(57) ABSTRACT

A hierarchy of project and personal tasks is maintained for users associated with multiple projects. The hierarchy is maintained using a computer server machine having a processor and network connection to a client machine having a computer display. A user-task list is obtained. The user-task list includes a first-project task having an initial first-project task score, wherein the first-project task is associated with a first-project, the first-project having a first-project task list including the first-project task The user-task list also includes a second-project task having an second-project task score, wherein the second-project task is associated with a second-project, the second-project having a second-project task list including the second-project task. The user-task list also includes an initial user-task hierarchy ranking the first-project task and second-project task based on the initial first-project task score and the second-project task score.

19 Claims, 10 Drawing Sheets

TASK HIERARCHY IN AN EVENT-DRIVEN COMMUNICATION SYSTEM

CROSS-REFERENCE TO RELATED APPLICATION

This application claims priority to U.S. Provisional Application Ser. No. 61/168,063 filed Apr. 9, 2009, which is incorporated herein by reference in its entirety for all purposes.

BACKGROUND

1. Field

This application relates generally to a task management system for maintaining a current task hierarchy for a user participating in multiple project teams and, more specifically, to determining a task hierarchy for a list of tasks based on a score for each task in the list and presenting the task hierarchy to the user.

2. Description of the Related Art

In general, there is a need to provide a computer-based system that allows a user to organize and execute a list of tasks that involve a group of people belonging to different project teams. In general, a team leader or project manager uses a computer-based system (e.g., project management software) to identify project tasks, assign resources to those tasks, and develop a task execution sequence. Traditional computer-based systems memorialize a sequence of project tasks as determined and entered by the team leader. Typically, the project tasks are arranged in a sequence according to their relative priority within a given project. Team members can then follow the project sequence as part of a project plan presented in a chart or other visual project summary.

One drawback to traditional computer-based systems is that it is difficult for individuals to manage priorities for tasks assigned by multiple projects. For example, if an individual has responsibilities for two different projects of nearly equal importance, it may not be clear in which order the tasks should be performed. Traditionally, one project takes priority over the other for a period of time or until the project is complete. Additionally, using traditional computer-based systems, it's not possible to prioritize an individual's personal or private tasks with respect to the individual's responsibilities as part of a project team.

Another drawback to traditional computer based systems is that the project sequence is essentially fixed after the project plan is entered by the team leader. In general, tasks are sequenced according to interdependencies entered by the team leader and, without further input, the task order remains static. Using traditional computer-based systems, it may be possible to re-plan or re-prioritize the project to change the sequence of tasks, but this typically requires significant time and effort on the part of the team leader who must manually determine the new sequence. As a result, projects are not typically re-planned unless absolutely necessary and, therefore, rarely reflect the most current state of a project or order of priority.

Another drawback to traditional computer-based systems is that the project plan is primarily driven by the team leader, who may be in charge of keeping track of progress, updating the project plan, and notifying the team members of the impact to the overall schedule. Such systems rely heavily on the diligence and judgment of the team leader, and the system output may vary depending on the quality and experience level of the team leader. Additionally, focusing responsibilities on a single person can create a bottleneck in the flow of information, delaying the communication of project updates to individual team members. Also, focusing responsibilities on the team leader reduces the impact individual team members have on the project plan.

SUMMARY

In an exemplary embodiment, a hierarchy of project tasks is maintained for multiple projects. The hierarchy is maintained using a computer server machine having a processor and network connection to a client machine having a computer display. Using the computer server processor, a user-task list is obtained. The user-task list includes a first-project task having an initial first-project task score, wherein the first-project task is associated with a first-project, the first-project having a first-project task list including the first-project task The user-task list also includes a second-project task having an second-project task score, wherein the second-project task is associated with a second-project, the second-project having a second-project task list including the second-project task. The user-task list also includes an initial user-task hierarchy ranking the first-project task and second-project task based on the initial first-project task score and the second-project task score.

A set of parameters associated with the first-project task is obtained. An updated first-project task score is determined for the first-project task, wherein the updated first-project task score is determined based on the set of parameters. An updated user-task hierarchy is determined by ranking the first-project task and the second-project task based on the updated first-project task score and the second-project task score. The user-task list is displayed to a user. The user-task list is in a format depicting the updated user-task hierarchy.

In another exemplary embodiment the first-project task list is obtained. The first-project task list includes the first-project task, an additional first-project task having an additional first-project task score, and an initial first-project task hierarchy ranking the first-project task and additional first-project task based on the initial first-project task score and the additional first-project task score. An updated first project task hierarchy is determined by ranking the first-project task and the additional first-project task based on the updated first-project task score and the additional first-project task score. The first-project task list is displayed to the user. The first-project task list is in a format depicting the updated first-project task hierarchy. In one exemplary embodiment, the ranking of the first-project task in the updated user-task hierarchy is different than the ranking of the first-project task in the updated first-project task hierarchy.

In another exemplary embodiment the user-task list also includes a personal task having a personal task score, wherein the personal task is not associated with a project having a project task list. The updated user-task hierarchy is determined by ranking the first-project task, the second-project task, and the personal task based on the updated first-project task score, the second-project task score, and the personal task score.

The figures depict one embodiment of the present invention for purposes of illustration only. One skilled in the art will readily recognize from the following discussion that alternative embodiments of the structures and methods illustrated herein can be employed without departing from the principles of the invention described herein.

DETAILED DESCRIPTION

Figure 5:
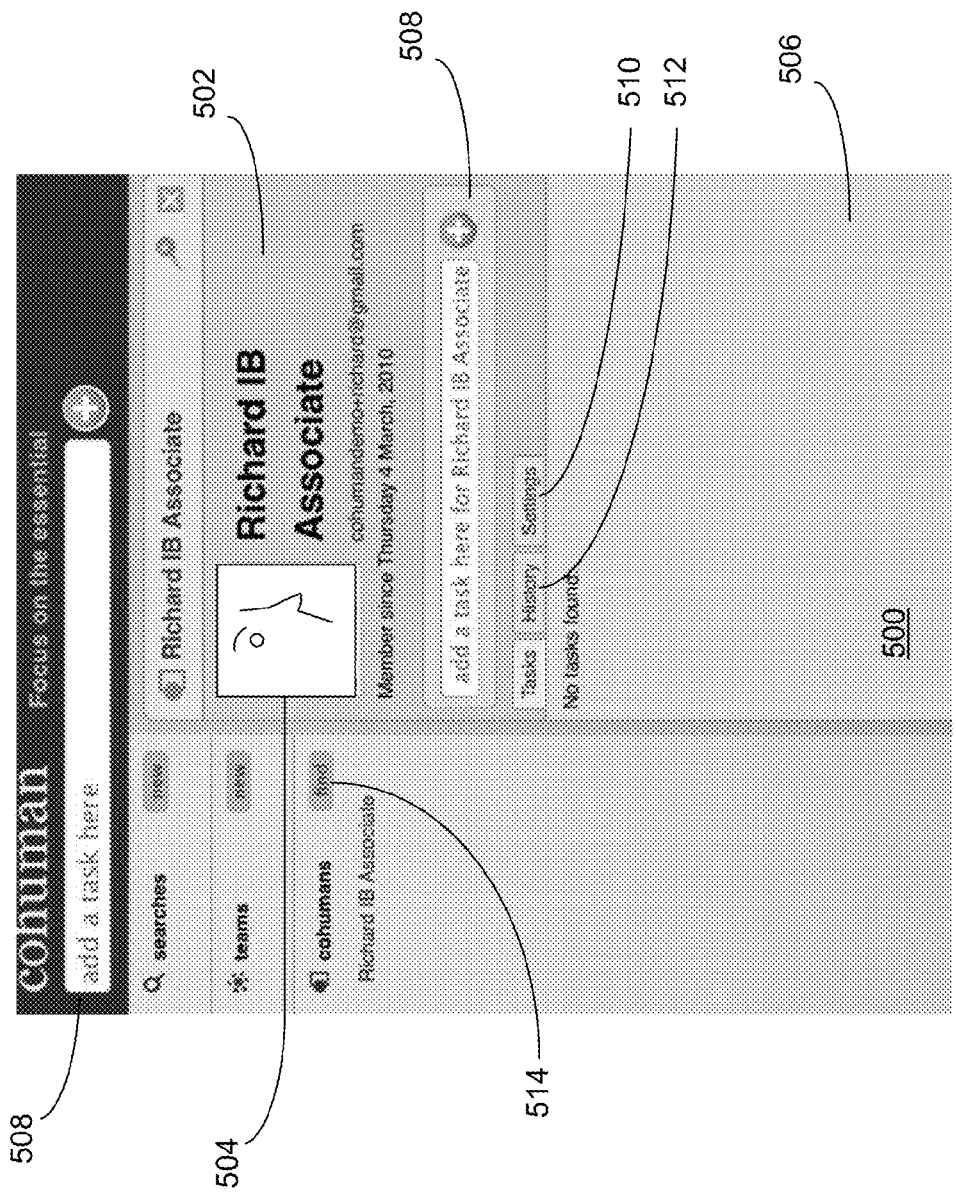
FIG. 5 depicts an exemplary user profile window.

The computer-based system described herein allows users to create, manage, and share business and personal tasks. In general, the system can be implemented using one or more web-enabled computers, preferably connected to a wide area network or the Internet. Users interact with the system using a local client computer capable of running the client portion of a web-based interface. Each system user is represented by a unique and customizable user profile. FIG. 5, described in more detail below, depicts an exemplary user profile window 500.

The system organizes a group of tasks associated with a user profile into a task list. Each task list in the system represents a series of events that must be executed or verified by an individual user identified by the user profile. The system also organizes tasks into project task lists, which are associated with one or more user profiles that form a project team. Described in greater detail below, a task is an entry stored in the system that represents an associated event. Typically, a task is assigned to a user who is responsible for completing the associated event. Other users in the project team may view the task but are not necessarily responsible for the completion of the associated event.

The system allows a user to manage all tasks stored in the system that they have been assigned. Using the system, a user can manage a set of personal tasks that may not be shared with other users in the system. In addition, a user may also manage tasks that are associated with one or more project teams. A project team typically identifies one or more user profiles of users who share responsibility for completing a series of related project events associated with project tasks stored in the system. By creating project teams, users can delegate the workload across team members and maintain a current prioritization for all of the tasks, personal and business, that must be completed by individual team members.

The system allows the membership of a project team to correspond to the team's task responsibilities. New members may be added to the project team as needed or may be removed from the team once their portion of the project is complete. In some cases, a project team also includes users who are following the project team's progress but are not responsible for any of the events associated with the team's tasks. Users can also follow individual tasks and not just project teams. The system also allows a user to select individual tasks to follow. A user that is following a task may receive updates to task information, but is not responsible for events associated with the task.

By prioritizing tasks, the system provides a tool for managing projects and coordinating tasks for a large number of users across multiple project teams. In particular, the system determines a task score based on a process, described in more detail below. The task score represents an estimate of the relative importance of each task with respect to other tasks in the system. In some cases, a task score is used to determine a task list order or hierarchy, which indicates a preferred completion sequence to the user. The task hierarchy for a group of tasks may be continually updated to reflect changes among multiple projects and multiple personal task lists being managed by the system. Using a scoring process, large numbers of tasks can be organized and prioritized without requiring a complete resolution of constraints associated with multiple project plans. In fact, the system is able to prioritize tasks and suggest a preferred order of completion without requiring the user to specify an explicit relationship among events.

1. Task

Figure 1:
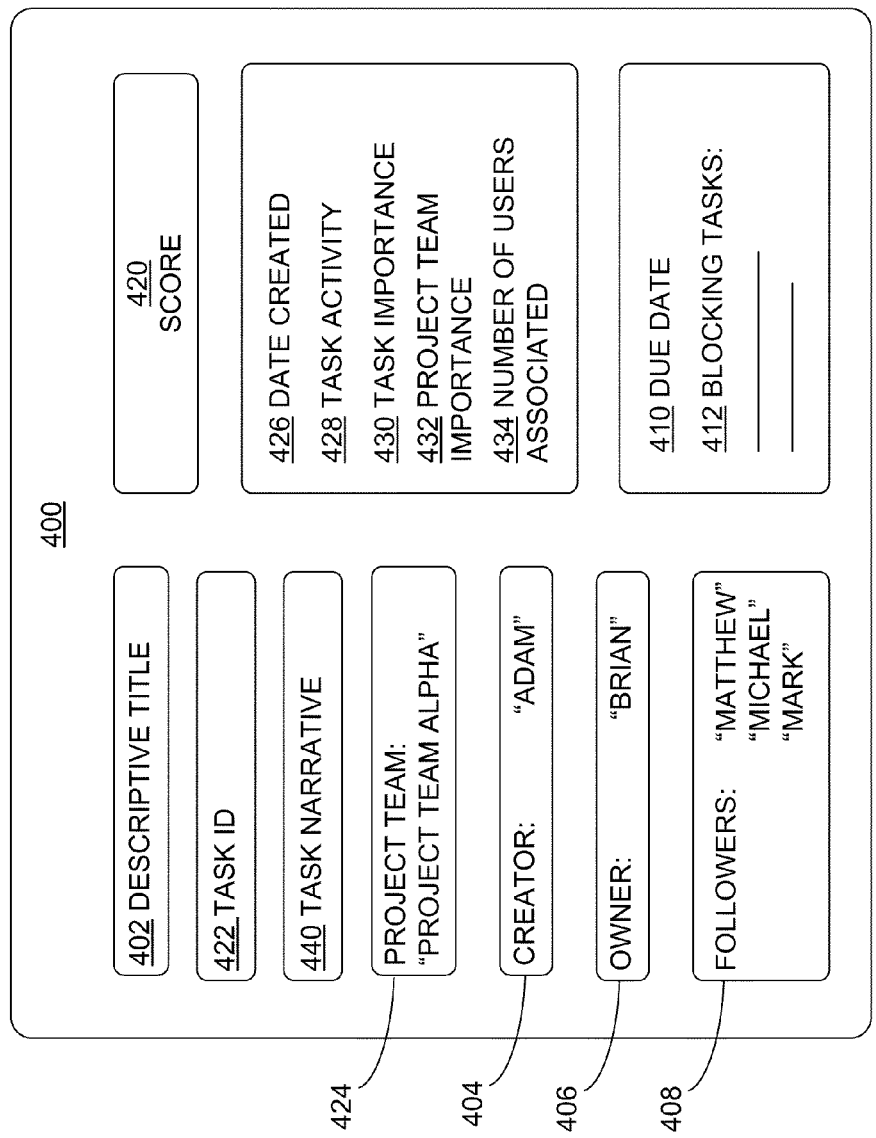
FIG. 1 depicts a schematic representation of an exemplary task.

A fundamental element of the system is the task, which represents an event that must be executed or verified. FIG. 1 depicts a schematic representation of an exemplary task 400, including variable descriptive information and task parameters.

Task 400 is associated with variable descriptive information that is used to identify the task 400 and used to identify project teams and system users associated with task 400. Variable descriptive information includes descriptive title 402, task identification 422, and task narrative 440. Additional descriptive information may also be associated with task 400, including a detailed task description, multiple user comments, and pointers to electronic file attachments.

The descriptive title 402 is a text string variable that indicates the particular event that must be performed or verified. Typically, the descriptive title 402 is short enough to be displayed using one or two lines of text. The text of the descriptive title 402 is not necessarily unique but should be descriptive enough to allow the user to differentiate task 400 among a list of other tasks. The task identification 422 is a unique identifier that allows the system to track the task 400 and may represent a serial number assigned to task 400 at the time it is created. The task narrative 440 provides the user a more details about the task. For example, the task narrative may provide specific instructions or an explanation of the purpose of the task.

Task 400 is also associated with multiple task parameters that define how the task 400 relates to other tasks, users, and project teams being managed by the system. Exemplary task parameters include due date 410, blocking tasks 412, date created 426, task activity 428, task importance 430, project team importance 432, number of users associated 434. Other task parameters not depicted in FIG. 1 may also be associated with task 400. For example, task 400 may also be associated with a parameter that represents the estimated effort or difficulty in completing the event associated with task 400.

Task parameters due date 410 and blocking tasks 412 define explicit relationships between task 400 and other tasks in the system. Due date 410 represents the deadline date for task 400. Task 400 may also include parameters representing one or more dependencies, such as blocking tasks 412. Blocking tasks 412 identify other prerequisite tasks that must be completed before task 400. Not all tasks require a due date or task dependencies. In fact, the system is able to prioritize tasks and suggest a preferred order of completion without requiring the user to specify an explicit relationship among task events.

As the name suggests, date created 426 indicates the date that the task was created in the system. The date created 426 may be relevant for determining the age of task. Task activity 428 indicates the frequency at which a task has been viewed or edited. Task importance 430 and project team importance 432 are factors that signal the significance of the task or project team associated with the task. The number of users associated 434 is a measure of the number of users who are responsible for or are following the progress of task 400. In some cases, the number of users associated 434 also includes users who have viewed information associated with task 400.

FIG. 1 also depicts task score 420, which indicates the relative importance of task 400 with respect to other tasks in the system. As described in more detail below, task score 420 is determined using a process that can depend on several parameters, including due date, task dependencies, task age, amount of task activity, task significance, project team significance, number of system users involved and estimated effort. Task score 420 may also depend on other criteria including an organizational hierarchy of users associated with the task and user voting.

Task 400 is generally associated with one or more system user profiles. For example, task 400 is associated with user profiles that are designated as task creator 404, task owner 406, and list of task followers 408. As the name implies, the task creator 404 identifies the profile of the system user who created task 400. The task owner 406 identifies the user profile of the system user who is responsible for the completion of event represented by task 400. In some cases, the task owner 406 identifies a user who is responsible for performing an action associated with task 400. In other cases, the task owner 406 identifies a user who is responsible for monitoring or managing the completion of an event or action associated with the task 400. The task owner 406 can also be set to "nobody" if the task is associated with a project team. The list of task followers 408 indicates system users who receive communications regarding task 400. System users indicated by the list of task followers 408 are not typically responsible for completing an action associated with task 400, but may need to be informed of updates to information related to task 400. In most cases, changes to information related to task 400 are sent to the list of task followers 408 using an update message or e-mail.

As shown in FIG. 1, task 400 is also associated with a project team 424. Project teams represent one or more users who are participating or monitoring the progress of a project. It is acceptable for a project team to consist of a single member. In some cases, the initially project team 420 associated with a default project having a user identified as by the task creator 404 as its sole member. In general, a task can be associated with only one project team at a time.

2. Task Lists

The system is capable of organizing tasks into various task lists. For example, a user task list may be defined so as to include all of the tasks owned by a system user. Similarly, a project-team task list may be defined so as to include all of the tasks that are associated with a project team. Both types of task lists also indicate a preferred completion order or sequence.

Figure 2:
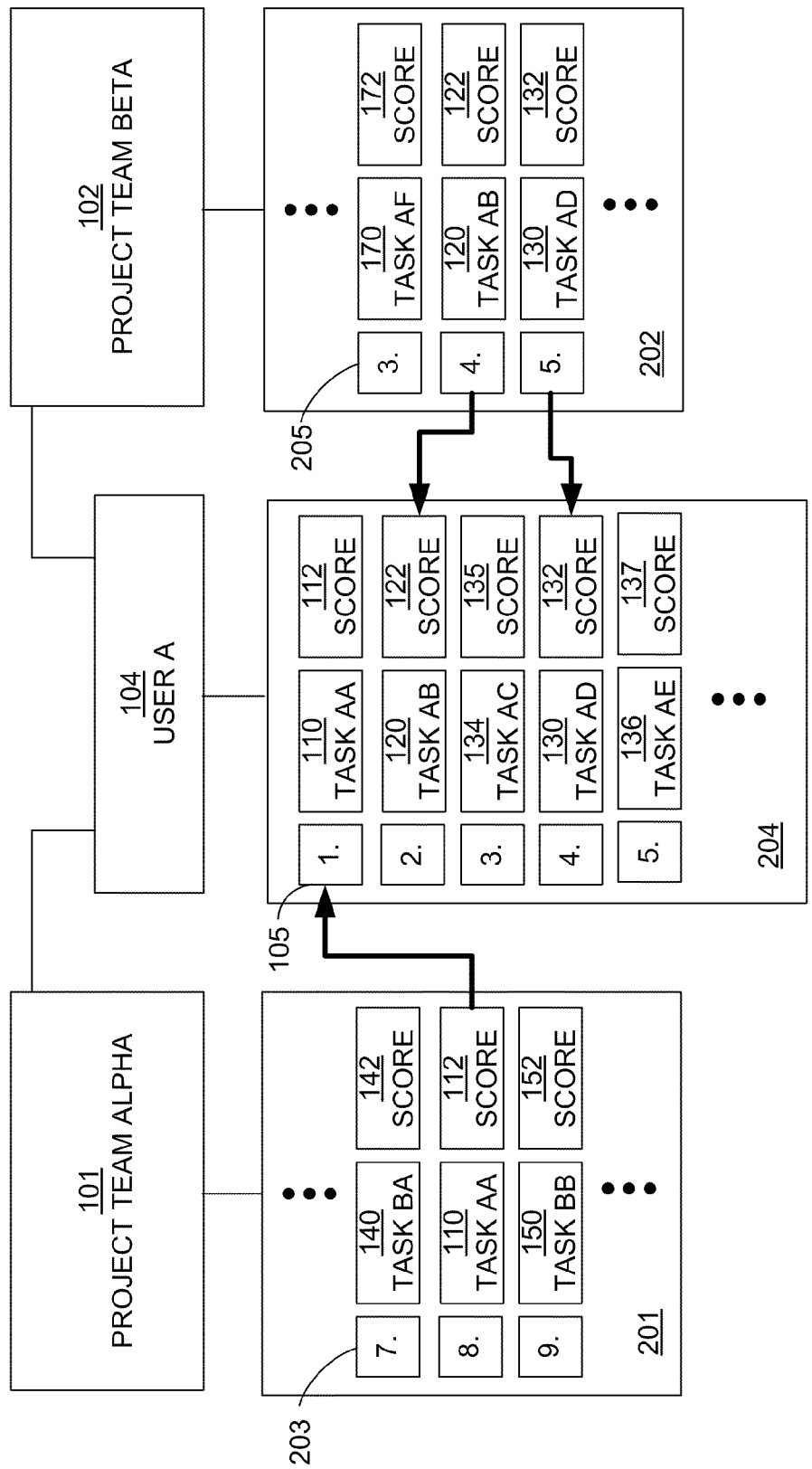
FIG. 2 depicts a schematic representation of a user task list including tasks from two different project task lists.

FIG. 2 depicts an exemplary user profile, user A 104, that is associated with both project team Alpha 101 and project team Beta 102. Each project team represents a group of users who are participating or monitoring the progress of a set of project tasks. User A 104 has an associated task list 204, including task AA 110, task AB 120, and task AC 130. Each task represents an action or event that a user, identified by user A 104, is responsible for completing. As shown in FIG. 2, user A 104 is assigned tasks from both project team Alpha 101 and project team Beta 102. User A 104 may also be assigned personal tasks that are not associated with a project team but are included in user A's task list 204.

User A's task list 204 has a task order 105, which indicates a preferred execution sequence. The task order 105 of tasks 110, 120, 134, 130, and 136 is determined based on the value of each task's respective task score 112, 122, 135, 132, and 137. The higher the score for a given task, the earlier the task will appear in the task order 105. The score of each task is dependent on a set of parameters that may change as information in the system is updated. Once an updated score is determined for at least one of the tasks in the list, a new task order 105 is determined to reflect the current task hierarchy.

Project team Alpha 101 has a corresponding task list 201 with tasks 140, 110, and 150 arranged in a task order 203. Each task is assigned to one or more team members who are responsible for completing an event or action associated with the task. As shown in FIG. 2, task 110 is assigned to user A 104 and, therefore, also appears in user A's task list 204. Similar to user A's task list 204, the task order 203 of the project task list 201 indicates a preferred execution sequence in accordance with each task's score 142, 112, and 152. While the task order 203 indicates a preferred execution sequence, the order may not indicate the actual order in which the tasks will be completed. For example, the tasks may be distributed among several project team members and completed according to each team members own task list order, which may not coincide with project team Alpha's order 203.

FIG. 2 also depicts project team Beta 102 also having a corresponding task list 202 with tasks 170, 120, and 130 arranged in a task order 205. Each task 170, 120, and 130 has an associated score 172, 122, and 132, respectively. As shown in FIG. 2, tasks 120 and 130 are assigned to user A 104 and, therefore, also appear in user A's task list 204.

In some cases, user A 104 may only be associated with one project team. In this case, user A's task list 204 includes tasks from the one project team and user A's personal tasks that are not associated with any project team. For example, if user A 104 is only associated with project team Beta 102, user A's task list would include only tasks 120, 134, 130, and 136. The task order 105 would be determined based on task scores 122, 135, 132, and 137. Thus, the task order 105 would reflect the relative priority between user A's personal tasks and user A's tasks associated with project team Beta 104.

If user A is not associated with a project team, user A's task list 204 would include only personal tasks. In this case, the task order 105 of personal tasks 134 and 136 would be determined using personal task scores 135 and 137, reflecting the relative priority of user A's personal tasks.

Figure 3:
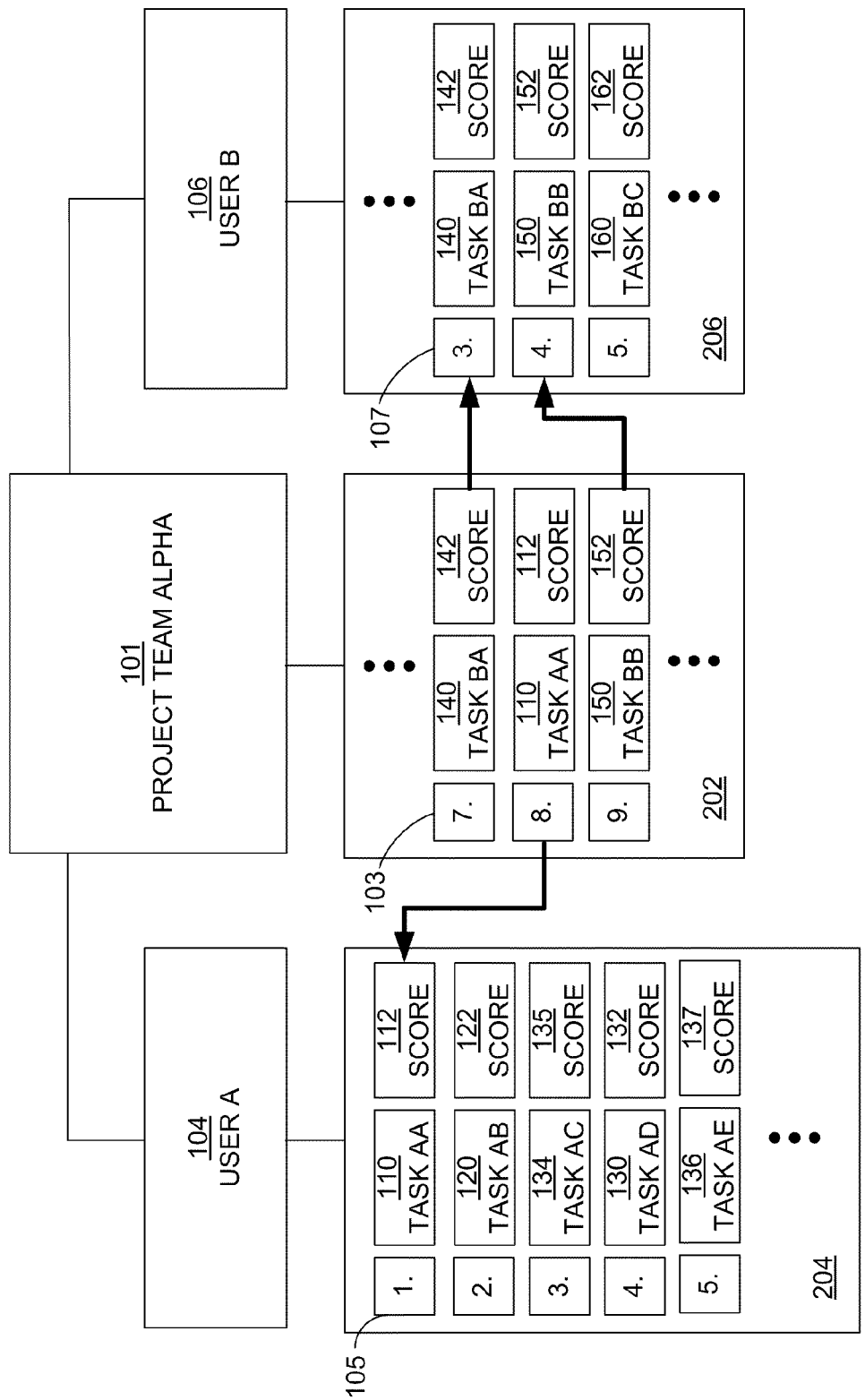
FIG. 3 depicts a schematic representation of a project task list with tasks delegated to two different users.

FIG. 3 depicts two members of project team Alpha 101, identified by profiles user A 104 and user B 106. The users are delegated different tasks from the Alpha project team task list 202. As described above, the delegated tasks are ordered in each team member's task list according to their respective task scores. Team member user B 106 has a task list 206 including task items 140, 150, and 160 arranged in task order 107 according to their respective task score 142, 152, and 162.

In general, users identified as members of the same team can view the task lists of other members of the same project team. However, users identified as team members may not be able to see tasks in other members' lists with which they are not associated. For example, while a user associated with user B 106 may see user A's task list 204, he or she may not be able to see user A's tasks 120 and 130, which are not associated with the project team Alpha 101.

Figure 4:
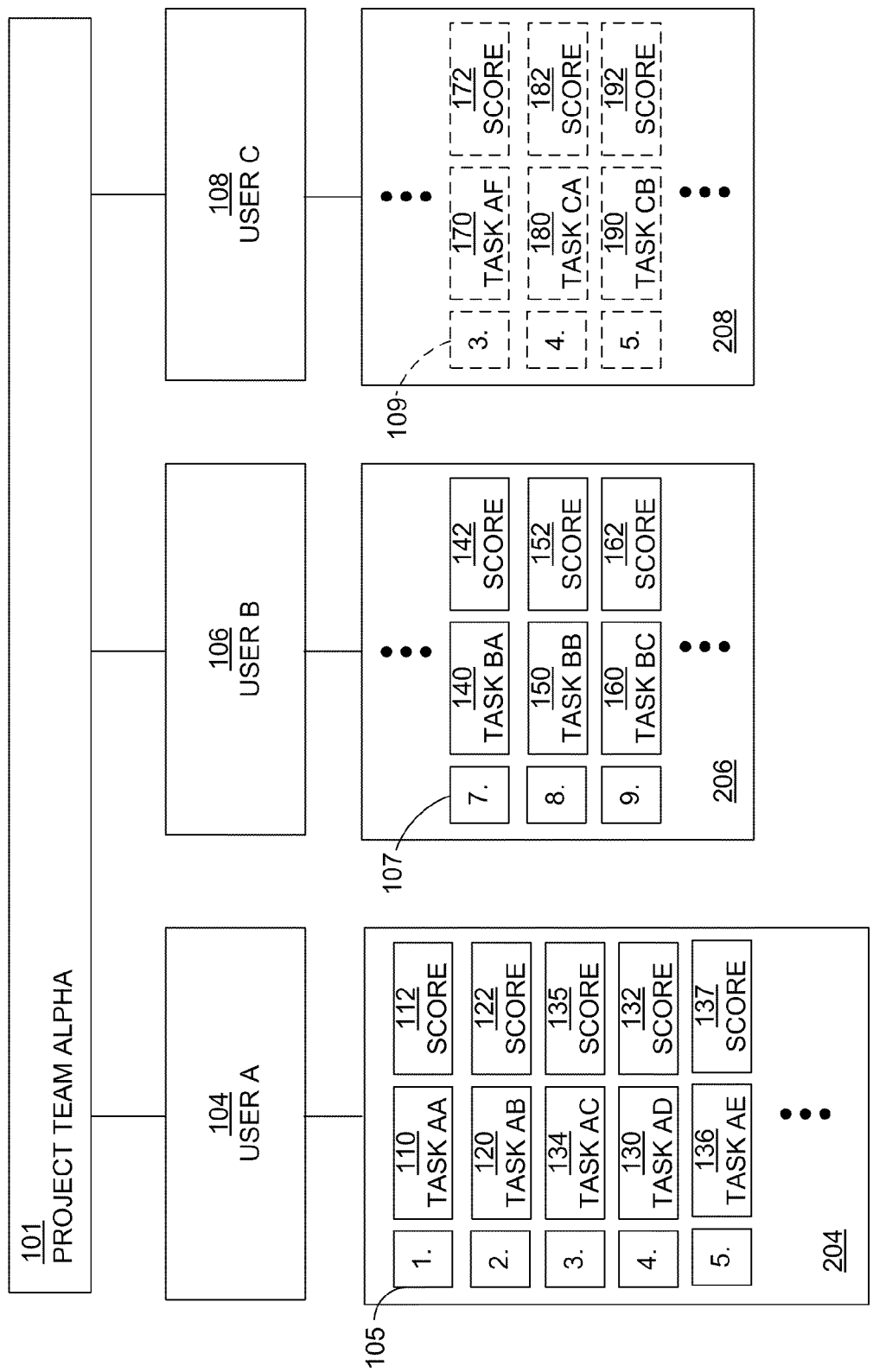
FIG. 4 depicts a schematic representation of a project team with three team members.

FIG. 4 depicts an exemplary schematic of project team Alpha 101 with three members: user A 104, user B 106, and user C 108. As shown in FIG. 3, user A 104 and user B 106 are both delegated at least one task associated with project team Alpha 101. User C 108 is associated with project team Alpha 101 but may not be assigned any project tasks. For example, user C 108 may be designated as a follower or as an owner for one or more of the tasks in the project team's task list 202. As an owner or follower for any task associated with project team Alpha 101, the user identified by user C 108 is able to view information about other tasks and team members associated with the project team. The user associated with user C 108 may also receive e-mail updates and/or messages regarding the status of tasks or team members associated with project team Alpha 101. Although user C 108 has a task list 208 (including tasks 170, 180, and 190), because the tasks are not associated with project team Alpha 101, they may not be visible to team members associated with user A 104 and user B 106.

3. Task Scoring

Each task in the system is assigned a task score. As described earlier, the task score is an indication of the overall importance of the task with respect to other tasks in the system. The task score allows for a comparison of tasks associated with different project teams and different user profiles.

In general, the task score depends on a set of parameters that are associated with the task. In particular, each parameter is given a weight according to its contribution to a composite score. Parameters that may be used in determining a task score are due date, blocking tasks or dependencies, date created, task activity, task importance, project team importance, number of users associated, and estimated effort. In some cases, organizational hierarchy of the users and user voting may also determine the task score.

Each parameter has its own scaling factor. Scaling factors can be any number value including 0 to indicate an insignificant parameter and negative numbers to indicate a score reducing parameter. In general, the scaling factor for a given parameter is not dependent on the task. However, in some cases the scaling factor may vary according to the user profiles or project teams that are associated with a particular task that is being scored.

A task score is determined by adding the contributions of each task parameter multiplied by its respective scaling factor. For example, a task score $S_{task}$ is determined as:

$$S_{task} = F_A * P_A + F_B * P_B + F_C * P_C \qquad \text{Equation 1}$$

where $F_A$ is the scaling factor for parameter $P_A$, $F_B$ is the scaling factor for parameter $P_B$, and $F_C$ is the scaling factor for parameter $P_C$. The parameters used to determine $S_{task}$ using equation 1 can be any subset of the task parameters described above for task 400 and depicted in FIG. 1. The value of a task parameter may be bounded by a maximum value to limit its contribution to the task score $S_{task}$. The value of a task parameter may also be the result of an additional calculation, such as an average value over a given time or a standard deviation for a population of values.

As an illustrative example, parameter $P_A$ may represent the number of followers for a given task being scored. The value of $P_A$ is the number of users receiving notifications or updates to task information. That is, the more users that are notified when task information is updated, the higher the task will be scored. Conceptually, $P_A$ may indicate the importance of the task measured in part by the size of the task audience.

Other parameters may also be used to estimate size of a task audience. For example, parameter $P_B$ may represent the number of users that have recently viewed the task profile or task information. Conceptually, $P_B$ may indicate the importance of the task measured in part by recent user interest in the task being scored.

Exemplary parameter $P_C$ may represent a value that indicates the time remaining before the task deadline. As an example, $P_C$ may be determined as:

$$P_C = T - D, \qquad \text{Equation 2}$$

where T is the estimated time to complete the task and D is the days remaining before the task deadline. As the deadline approaches, $P_C$ increases resulting in a higher score.

In some cases a stochastic parameter representing a random value may also be included in the determinations of $S_{task}$ as shown in equation 1. The stochastic parameter provides for some fluctuation in task score even if the other task parameters do not change. Conceptually, this prevents a lower scoring task from always being listed at the end of a task list, where it may be ignored.

As described above, one or more of the parameters may indicate other tasks that are dependencies the task being scored. For example, blocking tasks designate other tasks that must be completed as prerequisites to completing the task. The score of the task should also factor in the score of any blocking tasks. In one example, the score for a task is determined by adding the result of equation 1 to the score of an identified blocking task that has the highest score as compared to other identified blocking tasks. In this way, a task's score will always be higher than that of its highest scoring dependent tasks. In some cases, the result of equation 1 is scaled relative to the score of the dependent task being added to minimize the distortion of the value due to adding two scores (e.g., score doubling). Because the task score may depend on other task scores, it may be necessary to iterate a score calculation multiple times.

As described above, the score of a task is a measure of its importance relative to other tasks in the system. This allows the system to determine a task hierarchy for tasks associated with different users and different project teams. If the scores for two items are the same, tie-breaking criteria may be used to compare the relative importance of the two scores. For example, a task with a more recent creation date may be considered more important and, thus be placed higher in the task hierarchy.

4. Exemplary User Interface

The following discussion provides an exemplary web-based user interface for creating, managing, and sharing business and personal task lists. Typically, the user interface is displayed using an Internet (web) browser application running on a user's local computer system. The task management system may be accessed via a URL that directs the user's Internet browser to a login screen or main page. Typically, the task management system runs on one or more server computers that are able to manage a web-based communication with the user's local computer. In some cases, the user's local computer is a mobile terminal device.

Initially, a system user must provide at least some of the information associated with a user profile. FIG. 5 depicts an exemplary user profile window 500 that depicts information that may be entered directly by the user, e.g., Richard. In some cases, Richard is prompted to enter a user name and a brief biography when he logs into the system for the first time. The entry is stored and displayed in the user name field 502. Richard can also upload a user image 504, allowing other users to quickly identify him as a team member or as being associated with various tasks in the system. Text entry boxes under the settings tab 510 allow Richard to enter additional profile information, including e-mail address, notification preferences, login password, address, telephone number, and other personal information. Additionally, information may be associated with a user that is not entered directly by Richard, including, for example, a user creation date and an event history log. The event history log stores transaction information generated by the system activity and may be viewed by selecting the history tab 512.

Richard can invite others to join the task management system by using the add feature initiated by selecting find button 514. The add feature locates a user within the system or sends an e-mail notification to a prospective user with an electronic invitation. Richard may find or invite all the people who will be associated with a set of tasks before delegating task responsibilities.

Task list field 506 depicts the tasks assigned to the user, Richard IB Associate. As described above, each task has an associated task score. The tasks are typically presented in an order ranking the tasks according to their relative task score value. The task that has the highest score appears at the top of the list and is followed by tasks with decreasing score values. The task score is the same, regardless of which task list it appears in. However, placement of the task in the task hierarchy may change depending on the task's score as compared to the scores of the other tasks in the list.

Figure 6A:
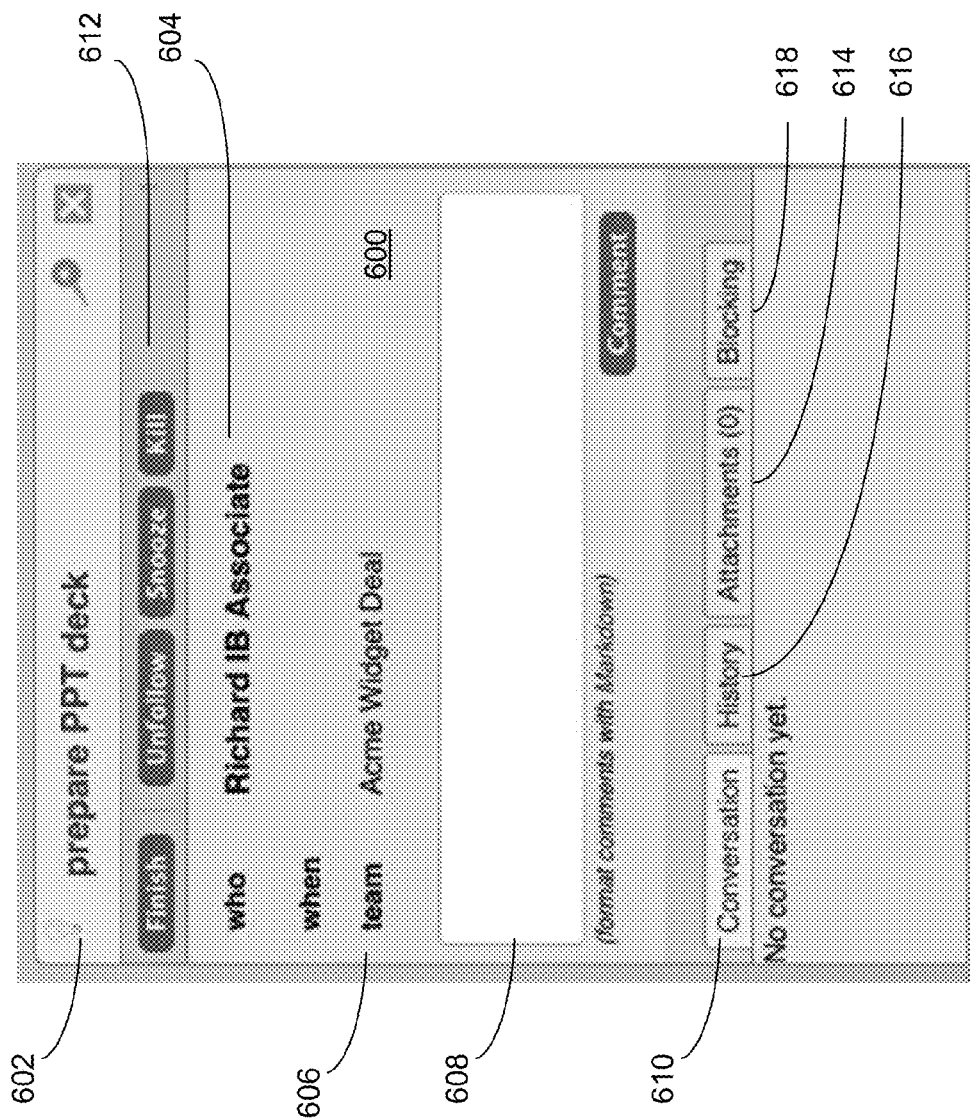
FIGS. 6A and 6B depict an exemplary task profile window.
Figure 6B:
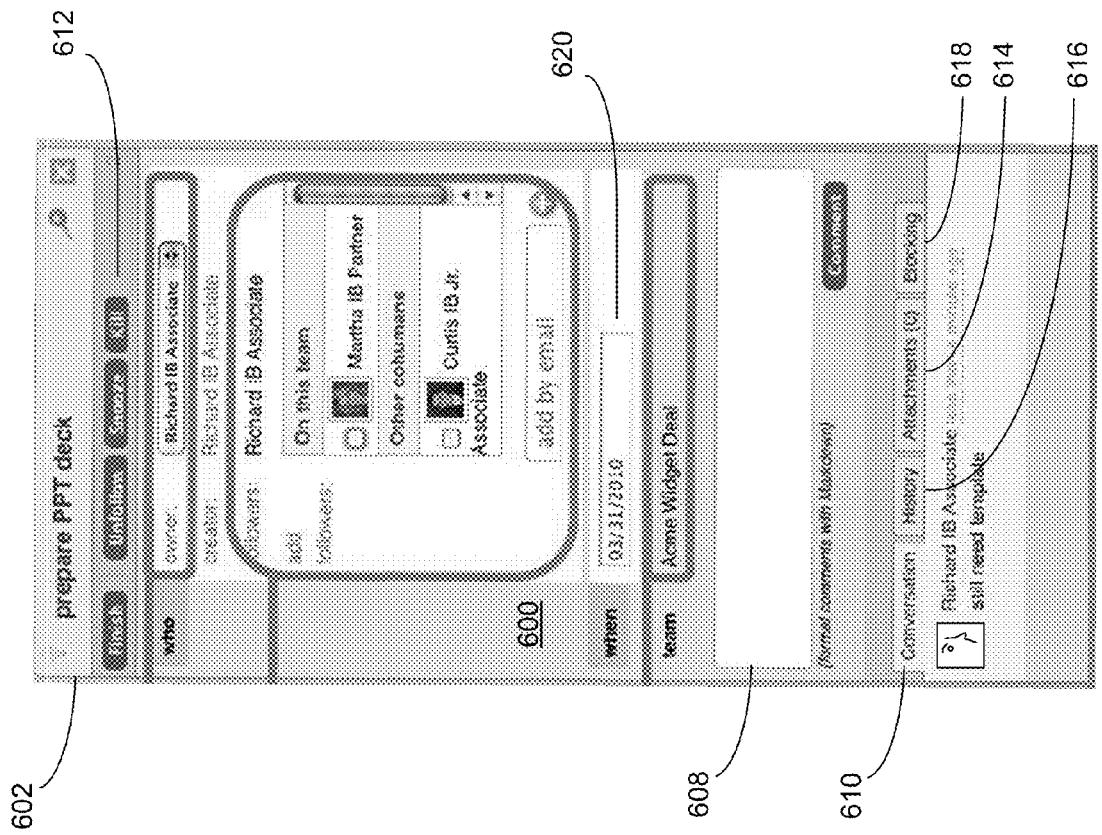

To create a new task, Richard may enter a task name in the add-task field 508. As shown in FIG. 5, the add-task field may be located in the user profile window or in another portion of the system interface. Once Richard enters a task name, a task profile is created. FIGS. 6A and 6B depict a task profile window 600. Initially, the task depicted in task profile window 600 is associated with a set of default task parameters. Richard can modify the task by entering or modifying task parameters, as appropriate.

Richard may also perform various task actions by selecting one or more function buttons 612. By selecting "Finish," Richard indicates that the task has been completed. A completed task is removed from associated task lists or moved to the bottom of associated lists and designated as "finished." By selecting "Kill" a non-completed task is removed from associated task lists or moved to the bottom of associated lists and designated as "closed." A task may also be put on hold by selecting "Snooze." Richard can also remove himself as a follower of the task by selecting "Unfollow."

A task name field 602 appears in the title bar of the task profile window 600. As described above, the task name should be short and descriptive so that it can be easily identified and distinguished from other tasks in a list. Task user field 604 (displayed adjacent to the "who" caption in the task profile window 600) depicts one or more users that are associated with the task. Initially, Richard IB Associate is the default task creator, owner, and follower. The team field 606 depicts a project team associated with the user (e.g., Acme Widget Deal). In some cases, the initial project team is a private team that is visible only to the task owner. A private team may be appropriate for tasks that are personal in nature and are not likely to be delegated to other system users.

As task owner and creator, Richard may associate other users with the task by selecting the task user field 604 adjacent to the "who" caption. As shown in FIG. 6B, by selecting task user field 604, Richard is presented with a list of user names for users who are already associated with the team (Martha IB Partner and Curtis IB Jr.). Richard may also add a member to the team by entering an e-mail address or user name. Users who are designated as "owner" are responsible for completing the task. In some cases, the task owner performs an action or monitors an event represented by the task. A task follower does not have responsibility for the task but may receive notifications and updates regarding task activity. Typically, Richard remains the task creator and receives notifications and updates regarding the task.

The due date of the task can be modified by selecting the due date field 620 adjacent to the date caption in the task profile. The task profile window 600 also provides a comment field 608 that can be used to create a conversation entry and initiate a conversation with other users associated with the task. Conversation entries are viewed by selecting the conversation tab 610 and are typically ordered according to their respective entry date. A chronological history of task transactions is also maintained and viewable by selecting the history tab 616. Task transaction entries typically depict a user name associated with the transaction, a transaction time and date, and a brief description of the nature of the transaction.

Multiple electronic files may be associated with or attached to the task and viewed by selecting the attachment tab 614. By allowing multiple electronic files to be associated with the task, team members can share documents and document revisions by uploading a copy to the task management system. In some cases, the attached electronic files are read-only and may be removed only by a user designated as the task owner.

As previously described, a task may depend on the completion of other tasks in the system. Blocking tab 618 provides an interface identifying other tasks that may block completion of the task "prepare PPT deck." Users can add, remove, or modify one or more blocking tasks using the interface within the blocking tab 618. Using the blocking tab 618, a set of tasks can defined so as to reflect a preferred serial completion order. However, it is not required that the task be dependent on any other task in the system.

In general, the task is visible only to system users who are associated either with the task or with the project team associated with the task. As mentioned earlier, associating a task with a private team allows a user to create and manage personal task lists that are not visible to other users in the system. The personal tasks will appear in the user's task list along with other tasks that are associated with other project teams. Typically, the user task list depicts a task hierarchy according the each task's score. That is, tasks with the highest score are higher in the task hierarchy that tasks with lower scores.

Figure 7:
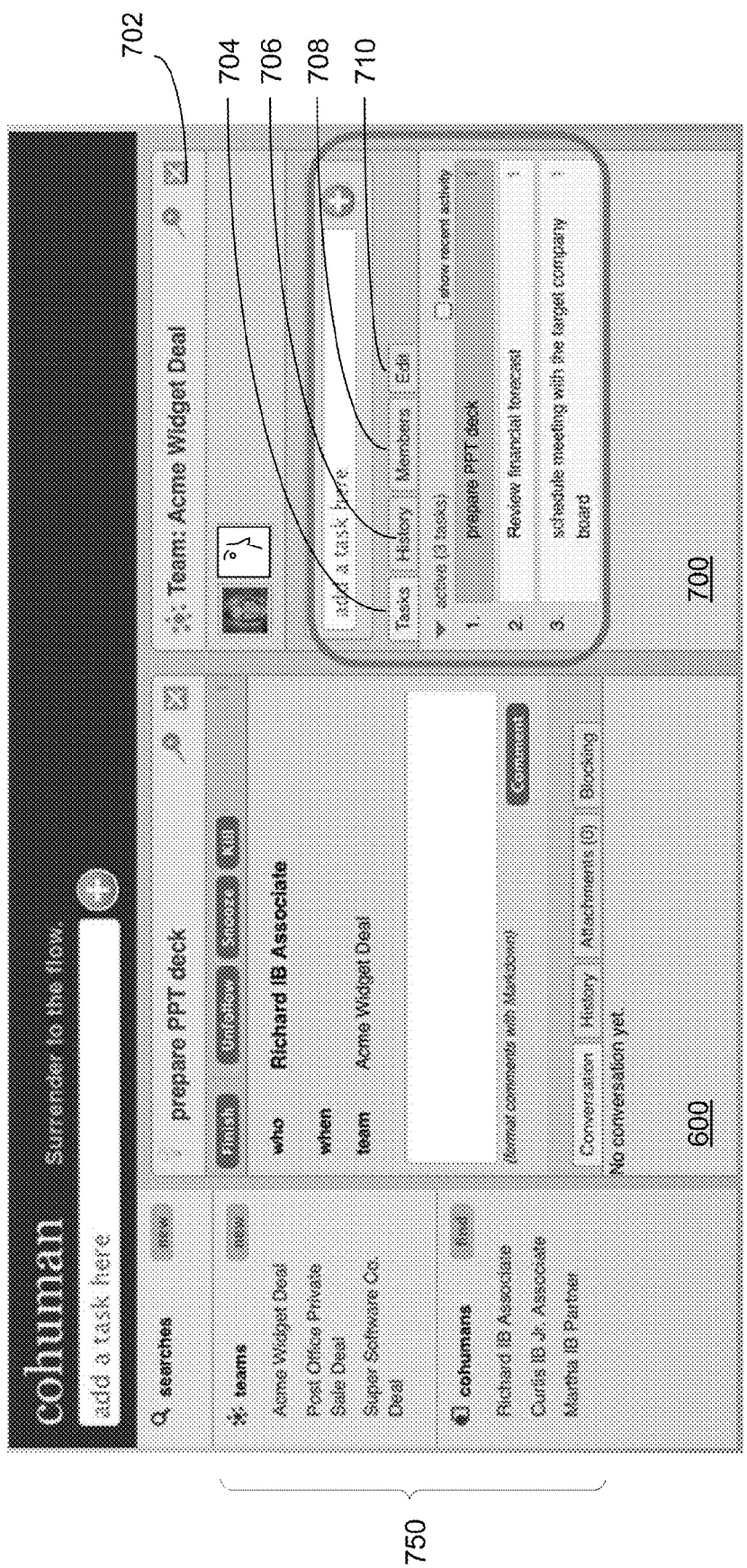
FIG. 7 depicts an exemplary project team profile window and exemplary task profile window.

FIG. 7 depicts an exemplary project team profile window 700 titled "Acme Widget Deal" and task profile window 600 titled "prepare PPT deck." The project team profile window 700 includes a team name field 702 and multiple tabs, including task list tab 704, history tab 706, members tab 708, and edit tab 710. A complete list of tasks associated with the project team is presented under the task list tab 704. Typically, the tasks depicted in the task list tab 704 are arranged in an order from highest task score to lowest task score indicating the task hierarchy.

As shown in FIG. 7, project team profile 700 also depicts a user image for each team member, e.g., Richard and Martha. A complete list of members is also available by selecting members tab 708. Additionally, the edit tab 710 allows an existing team member to add members to or remove members from the project team. Members may also be added by associating a task with the project team. For example, if a new task is associated with the project team Acme Widget Deal, any users associated with the new task will also be added to the project team.

In general, a user can access a significant portion of the system information via the user profile window 500, task profile window 600, and project team profile window 700. The system also provides navigational shortcuts that allow the user to access profiles required for a particular user session. The navigational menu 750 depicted in FIG. 7 allows the user to select from a list of project teams and other system users that have an association with the user.

5. Computer and Computer Network System

Figure 8:
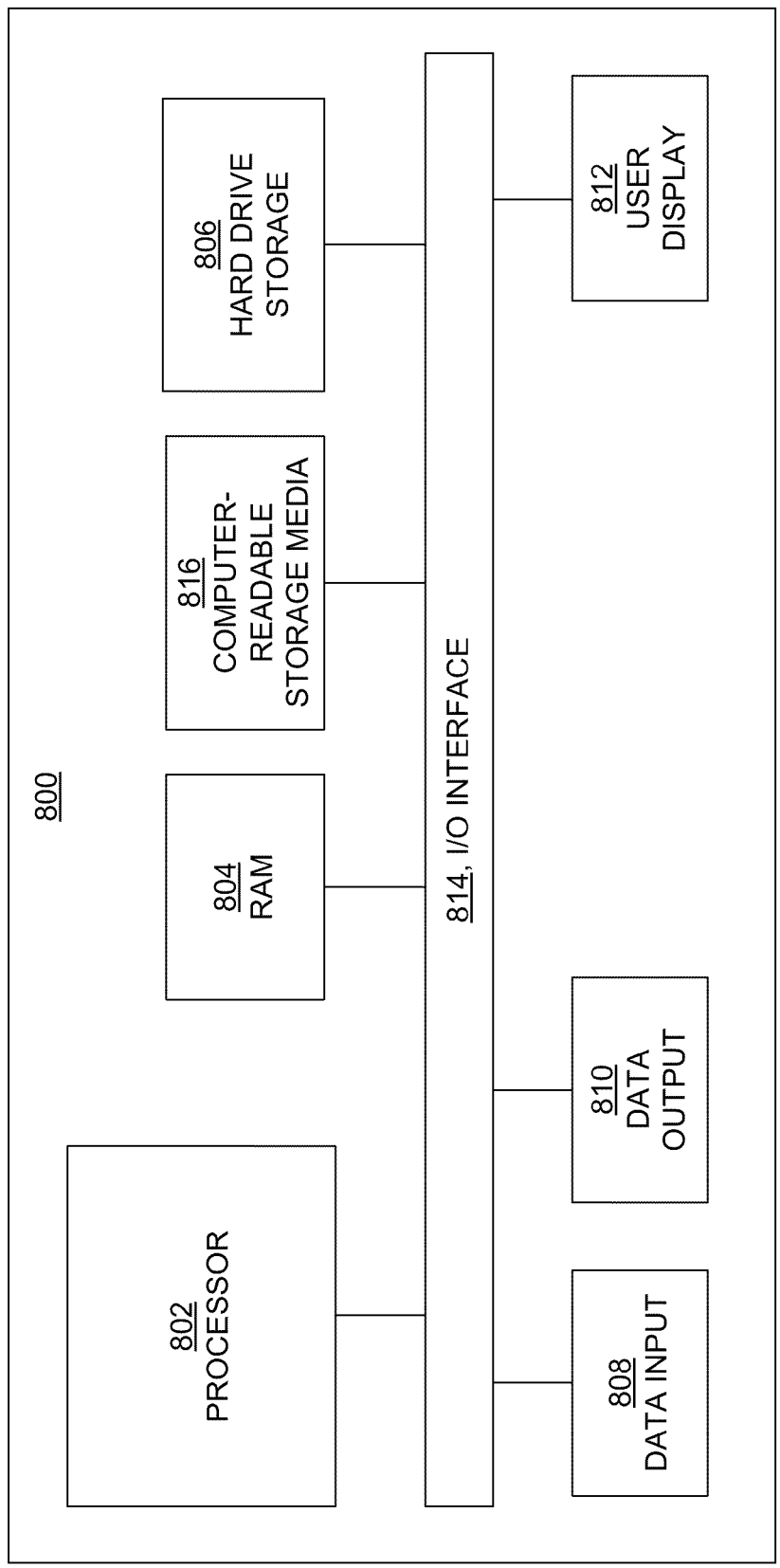
FIG. 8 depicts an exemplary computer system.

The embodiments described herein are typically implemented as computer software (computer-executable instructions) executed on a processor of a computer system. FIG. 8 depicts an exemplary computer system 800 configured to perform any one of the above-described processes. Computer system 800 may include the following hardware components: processor 802, input/output interface 814, random access memory (RAM) 804, hard drive storage 806, other computer-readable storage media 816, data input devices (e.g., keyboard, mouse, keypad) 808, data output devices (e.g., network connection, data cable) 810, and user display (e.g., display monitor) 812.

Processor 802 is a computer processor capable of receiving and executing computer-executable instructions for performing any of the processes described above. Computer system 800 may include more than one processor for performing the processes. The computer executable instructions may be stored on one or more types of non-volatile storage media including RAM 804, hard drive storage 806, or other computer-readable storage media 816. Other computer-readable storage media 816 include, for example, CD-ROM, DVD, magnetic tape storage, magnetic disk storage, solid-state storage, and the like.

Figure 9:
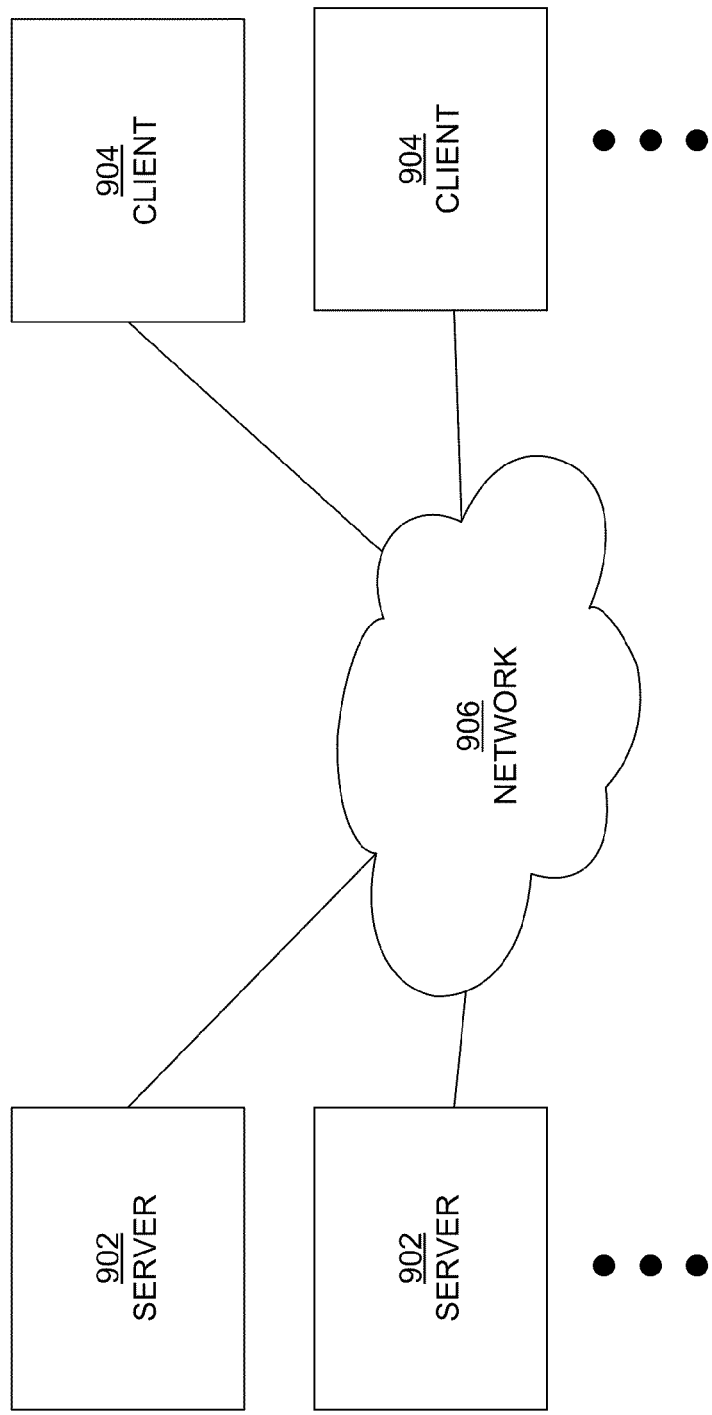
FIG. 9 depicts an exemplary computer network system.

FIG. 9 depicts an exemplary computer network for distributing the processes described above to multiple computers at remote locations. One or more servers 902 may be used to perform portions of the process described above. For example, one or more servers 902 may store and execute computer-executable instructions for receiving user input, storing profile and task information, and generating a web-enabled interface. The one or more servers 902 are specially adapted computer systems that are able receive input from multiple users in accordance with a web-based interface. The one or more servers 902 are able to communicate directly with one another using a computer network 906 including a local area network (LAN) or a wide area network (WAN), such as the Internet.

One or more client computer systems 904 provide an interface to one or more system users. The client computer systems 904 are capable of communicating with the one or more servers 902 over the computer network 906. In some embodiments, the client computer systems 904 are capable of running a web browser that interfaces with a web-enabled system running on one or mover server machines 902. The web browser is used to accept input data from the user and present a display to the user in accordance with the exemplary user interface described above. The client computer 904 includes a computer monitor or other display device for presenting information to the user. Typically, the client computer 904 is a computer system in accordance with the computer system 800 depicted in FIG. 8. In some embodiments, the client computer system 904 is incorporated in a terminal device such as a cell phone, smart phone, or portable computer device.

In some embodiments, the client computer systems 904 perform all or portions of the process described above. For example, the client computer systems 904 may receive or store parameter information regarding a task and compute the task score based the received or stored parameter information. In other embodiments, the client computer system 904 functions as an interface tool and accepts information from a user and displays system outputs.

Although the invention has been described in considerable detail with reference to certain embodiments thereof, other embodiments are possible, as will be understood by those skilled in the art.

We claim:

1. A computer-implemented method for maintaining task hierarchies for multiple projects using a computer server machine having a processor and network connection to a client machine having a computer display, the method comprising:
    obtaining, using the computer server processor, a user-task list comprising:
        a first-project task having an initial first-project task score, wherein the first-project task is associated with a first-project, the first-project having a first-project task list including the first-project task,
        a second-project task having an second-project task score, wherein the second-project task is associated with a second-project, the second-project having a second-project task list including the second-project task, and
        an initial user-task hierarchy ranking the first-project task and second-project task based on the initial first-project task score and the second-project task score;
    obtaining, using the computer server processor, a set of parameters associated with the first-project task;
    determining, using the computer server processor, an updated first-project task score for the first-project task, wherein the updated first-project task score is determined based on the set of parameters;
    determining, using the computer server processor, an updated user-task hierarchy by ranking the first-project task and the second-project task based on the updated first-project task score and the second-project task score; and
    displaying, using the client machine computer display, the user-task list to a user in a format depicting the updated user-task hierarchy.

2. The computer-implemented method of claim 1, the method further comprising:
    obtaining, using the computer server processor, the first-project task list comprising:
        the first-project task,
        an additional first-project task having an additional first-project task score, and
        an initial first-project task hierarchy ranking the first-project task and additional first-project task based on the initial first-project task score and the additional first-project task score;
    determining, using the computer server processor, an updated first-project task hierarchy ranking the first-project task and the additional first-project task based on the updated first-project task score and the additional first-project task score; and
    displaying, using the client machine computer display, the first-project task list to the user in a format depicting the updated first-project task hierarchy.

3. The computer-implemented method of claim 2, wherein the ranking of the first-project task in the updated user-task hierarchy is different than the ranking of the first-project task in the updated first-project task hierarchy.

4. The computer-implemented method of claim 1, wherein the user-task list further comprises:
    a personal task having a personal task score, wherein the personal task is not associated with a project having a project task list, and
    wherein determining an updated user-task hierarchy further comprises ranking the first-project task, the second-project task, and the personal task based on the updated first-project task score, the second-project task score, and the personal task score.

5. The computer-implemented method of claim 1, wherein determining the task score for the first-project task comprises:

determining a scaling factor for each parameter of the set of parameters; and determining the task score as the sum of the product of each scaling factor and each respective parameter of the set of parameters.

6. The computer-implemented method of claim 5, wherein determining the task score for the first-project task further comprises:

obtaining a blocking-task score for a blocking task that is a prerequisite for the first-project task;

obtaining a blocking-task scaling factor for the blocking-task score; and determining the task score by adding the product of the blocking-task score and the blocking-task scaling factor to the sum of the product of each scaling factor and each respective parameter of the set of parameters.

7. The computer-implemented method of claim 1, wherein the format depicting the updated user-task hierarchy is a sequential list format with the highest-ranked task appearing first in the sequence.

8. The computer-implemented method of claim 1, wherein the set of parameters does not include a due date.

9. The computer-implemented method of claim 1, wherein the set of parameters includes information about a plurality of users associated with the first project.

10. A computer-implemented method for maintaining task hierarchies using a computer server machine having a processor and network connection to a client machine having a computer display, the method comprising:

obtaining, using the computer server processor, a user-task list comprising:
 a first-project task having an initial first-project task score, wherein the first-project task is associated with a first-project team, the first-project team having a first-project task list including the first-project task,
 a personal task having a personal task score, wherein the personal task is not associated a project team, and
 an initial user-task hierarchy ranking the first-project task and personal task based on the initial first-project task score and the personal task score;

obtaining, using the computer server processor, a set of parameters associated with the first-project task;

determining, using the computer server processor, an updated first-project task score for the first-project task, wherein the updated first-project task score is determined based on the set of parameters;

determining, using the computer server processor, an updated user-task hierarchy ranking the first-project task and personal task based on the updated first-project task score and the personal task score; and displaying, using the client machine computer display, the user task list to a user in a format depicting the updated user-task hierarchy.

11. The computer-implemented method of claim 10, the method further comprising:

obtaining, using the computer server processor, the first-project task list comprising:
 the first-project task,
 an additional first-project task having an additional first-project task score, and
 an initial first-project task hierarchy ranking the first-project task and additional first-project task based on the initial first-project task score and the additional first-project task score;

determining, using the computer server processor, an updated first-project task hierarchy ranking the first-project task and the additional first-project task based on the updated first-project task score and the additional first-project task score; and displaying, using the client machine computer display, the first-project task list to the user in a format depicting the updated first-project task hierarchy.

12. The computer-implemented method of claim 10, wherein determining the task score for the first-project task comprises:

determining a scaling factor for each parameter of the set of parameters; and determining the task score as the sum of the product of each scaling factor and each respective parameter of the set of parameters.

13. A computer system for maintaining task hierarchies for multiple projects, the system comprising:

a computer server machine having:
 a processor for executing computer-executable instructions,
 a network connection to a client machine having a computer display, and
 a memory storing computer-executable instructions for:
  obtaining a user-task list comprising:
   a first-project task having an initial first-project task score, wherein the first-project task is associated with a first-project, the first-project having a first-project task list including the first-project task,
   a second-project task having an second-project task score, wherein the second-project task is associated with a second-project, the second-project having a second-project task list including the second-project task, and
   an initial user-task hierarchy ranking the first-project task and second-project task based on the initial first-project task score and the second-project task score;
  obtaining a set of parameters associated with the first-project task;
  determining an updated first-project task score for the first-project task, wherein the updated first-project task score is determined based on the set of parameters; and
  determining an updated user-task hierarchy by ranking the first-project task and the second-project task based on the updated first-project task score and the second-project task score; and
  displaying, using the client machine computer display, the user-task list to a user in a format depicting the updated user-task hierarchy.

14. A non-transitory computer-readable storage medium storing computer-executable instructions for maintaining task hierarchies for multiple projects, the instructions comprising:

obtaining a user-task list comprising:
 a first-project task having an initial first-project task score, wherein the first-project task is associated with a first-project, the first-project having a first-project task list including the first-project task,
 a second-project task having an second-project task score, wherein the second-project task is associated with a second-project, the second-project having a second-project task list including the second-project task, and
 an initial user-task hierarchy ranking the first-project task and second-project task based on the initial first-project task score and the second-project task score;

obtaining a set of parameters associated with the first-project task;

determining an updated first-project task score for the first-project task, wherein the updated first-project task score is determined based on the set of parameters;

determining an updated user-task hierarchy by ranking the first-project task and the second-project task based on the updated first-project task score and the second-project task score; and displaying the user task list to a user in a format depicting the updated user-task hierarchy.

15. The non-transitory computer-readable medium of claim 14, the instructions further comprising:

obtaining the first-project task list comprising:
the first-project task,
an additional first-project task having an additional first-project task score, and
an initial first-project task hierarchy ranking the first-project task and additional first-project task based on the initial first-project task score and the additional first-project task score;
determining an updated first-project task hierarchy ranking the first-project task and the additional first-project task based on the updated first-project task score and the additional first-project task score; and
displaying the first-project task list to the user in a format depicting the updated first-project task hierarchy.

16. The non-transitory computer-readable medium of claim 15, wherein the ranking of the first-project task in the updated user-task hierarchy is different than the ranking of the first-project task in the updated first-project task hierarchy.

17. The non-transitory computer-readable medium of claim 14, wherein the user-task list further comprises:

a personal task having a personal task score, wherein the personal task is not associated with a project having a project task list, and wherein determining an updated user-task hierarchy further comprises ranking the first-project task, the second-project task, and the personal task based on the updated first-project task score, the second-project task score, and the personal task score.

18. The non-transitory computer-readable medium of claim 14, wherein determining the task score for the first-project task comprises:

determining a scaling factor for each parameter of the set of parameters; and determining the task score as the sum of the product of each scaling factor and each respective parameter of the set of parameters.

19. The non-transitory computer-readable medium of claim 18, wherein determining the task score for the first-project task further comprises:

obtaining a blocking-task score for a blocking task that is a prerequisite for the first-project task;

obtaining a blocking-task scaling factor for the blocking-task score;

determining the task score by adding the product of the blocking-task score and the blocking-task scaling factor to the sum of the product of each scaling factor and each respective parameter of the set of parameters.

* * * * *